United States Patent
Wang et al.

(10) Patent No.: US 11,635,926 B2
(45) Date of Patent: Apr. 25, 2023

(54) PRINTER IDENTIFYING CHARACTERISTICS

(71) Applicant: Hewlett-Packard Development Company, L.P., Spring, TX (US)

(72) Inventors: Yaze Wang, Boise, ID (US); Derek M Nelson, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/293,187

(22) PCT Filed: Jul. 30, 2019

(86) PCT No.: PCT/US2019/044089
§ 371 (c)(1),
(2) Date: May 12, 2021

(87) PCT Pub. No.: WO2021/021124
PCT Pub. Date: Feb. 4, 2021

(65) Prior Publication Data
US 2022/0171586 A1    Jun. 2, 2022

(51) Int. Cl.
*G06F 3/12*      (2006.01)

(52) U.S. Cl.
CPC .......... *G06F 3/1232* (2013.01); *G06F 3/1203* (2013.01); *G06F 3/126* (2013.01); *G06F 3/1238* (2013.01)

(58) Field of Classification Search
None
See application file for complete search history.

(56) References Cited

U.S. PATENT DOCUMENTS

| | | | |
|---|---|---|---|
| 6,560,417 B1 * | 5/2003 | Rodriguez | G03G 15/5033 399/27 |
| 8,451,473 B2 | 5/2013 | Hong et al. | |
| 8,902,454 B2 | 12/2014 | Liu et al. | |
| 9,007,613 B2 | 4/2015 | Vojak | |
| 9,092,165 B2 | 7/2015 | Tecu et al. | |
| 9,521,277 B1 | 12/2016 | Johnson | |
| 11,150,850 B1 * | 10/2021 | Cano | G06F 3/128 |
| 2010/0309503 A1 * | 12/2010 | Partridge | G06F 3/1292 358/1.14 |
| 2011/0085196 A1 * | 4/2011 | Liu | G06F 3/1204 358/1.15 |
| 2011/0096354 A1 | 4/2011 | Liu | |
| 2012/0026537 A1 * | 2/2012 | Uster | H04N 1/00278 358/1.15 |
| 2012/0250065 A1 * | 10/2012 | Partridge | G06F 21/608 358/1.14 |

(Continued)

FOREIGN PATENT DOCUMENTS

| | | |
|---|---|---|
| CN | 100440131 C | 12/2008 |
| WO | WO-2013059190 A1 | 4/2013 |
| WO | WO-2015174233 A1 | 11/2015 |

*Primary Examiner* — Henok Shiferaw
(74) *Attorney, Agent, or Firm* — Michael Dryja

(57) ABSTRACT

Examples disclosed herein relate to capturing an identifying characteristic of a printer, displaying a plurality of documents suitable for printing on the printer, receiving a selection of at least one document of the plurality of documents suitable for printing on the printer, and causing the selected at least one document to be delivered to the printer according to the identifying characteristic.

13 Claims, 3 Drawing Sheets

(56) References Cited

U.S. PATENT DOCUMENTS

| | | | |
|---|---|---|---|
| 2014/0104638 A1* | 4/2014 | Kato | H04N 1/4426 |
| | | | 358/1.14 |
| 2014/0136972 A1 | 5/2014 | Rodgers et al. | |
| 2016/0085489 A1 | 3/2016 | Hansen | |
| 2016/0112583 A1* | 4/2016 | Oguma | G06F 3/1267 |
| | | | 358/1.15 |
| 2016/0255242 A1* | 9/2016 | Osadchyy | H04N 1/00408 |
| | | | 358/1.14 |
| 2017/0070642 A1* | 3/2017 | Miyamoto | G06F 3/1226 |
| 2017/0308335 A1 | 10/2017 | Keane et al. | |

* cited by examiner

PRINTER IDENTIFYING CHARACTERISTICS

BACKGROUND

Multi-function devices often combine different components such as a printer, scanner, and copier into a single device. Such devices frequently receive refills of consumables, such as print substances (e.g., ink, toner, and/or additive materials) and/or media (e.g., paper, vinyl, and/or other print substrates).

Figure 1:
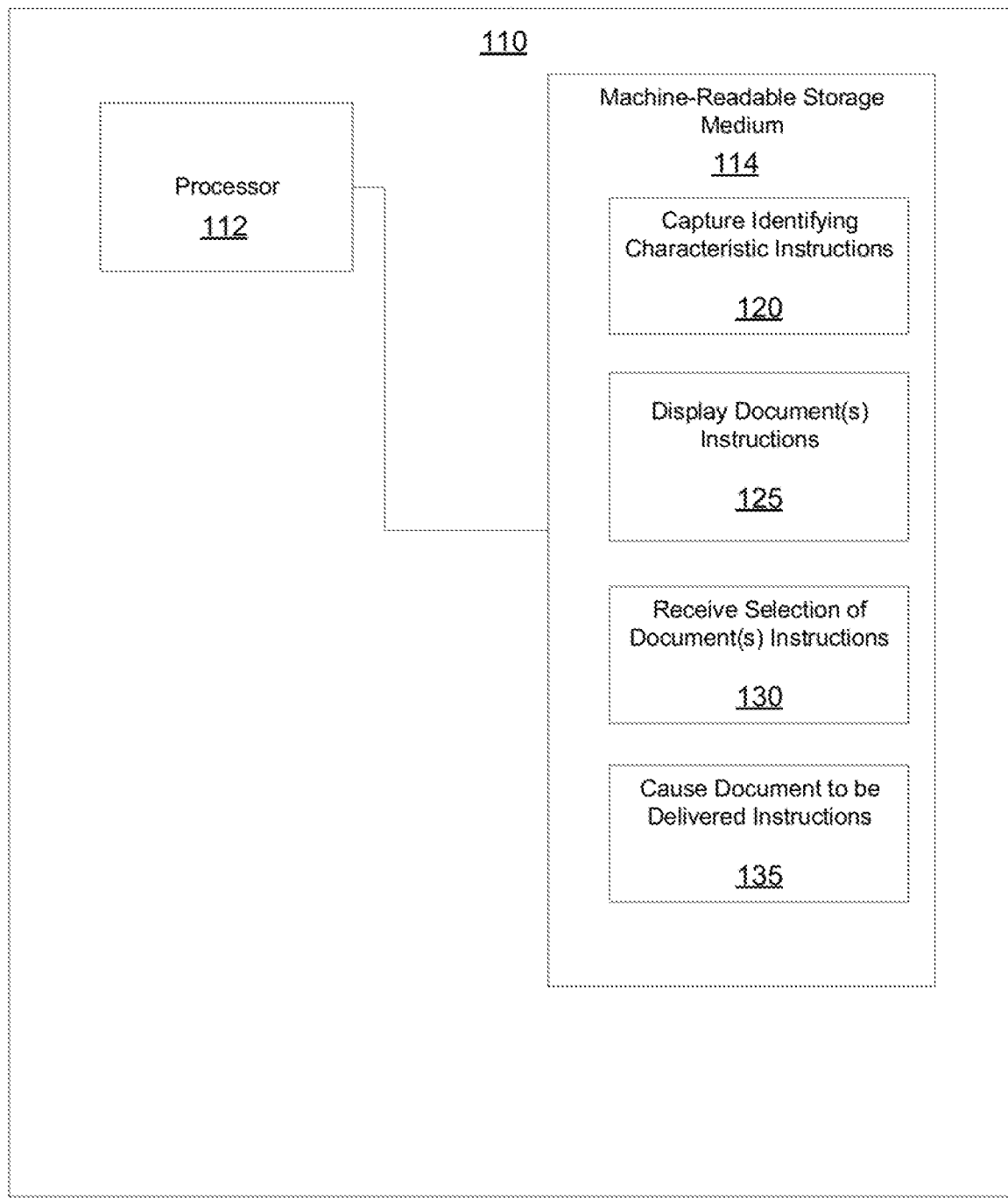
FIG. 1 is a block diagram of an example computing device for providing printer identifying characteristics.
Figure 1:
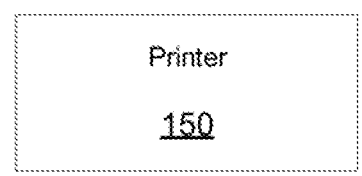

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

In some situations, a user may submit documents for printing to a queue, such as may be stored on a network/cloud storage location or mobile device. The user may approach a printer and capture an identifying characteristic of the printer, such as scanning a matrix code with a camera-equipped mobile device. The identifying characteristic may provide information, such as a network address, allowing the mobile device to communicate with the printer and cause the queued documents to be sent to the printer for printing.

FIG. 1 is a block diagram of an example computing device 110 for providing printer identifying characteristics. Computing device 110 may comprise a processor 112 and a non-transitory, machine-readable storage medium 114. Storage medium 114 may comprise a plurality of processor-executable instructions, such as instructions 120 and instructions 125. In some implementations, instructions 120, 125 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute capture identifying characteristic instructions 120 display document(s) instructions 125, receive selection of document(s)instructions 130, and cause document to be delivered instructions 135.

Executable instructions 120, 125, 130, 135 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Capture identifying characteristic instructions 120 may capture an identifying characteristic of a printer 150 in order to identify the specific printing device among a plurality of printing devices. For example, a user may utilize a camera-equipped mobile device to capture an image of some or all of the printer 150. For another example, an electronic device may capture a signal broadcast by the printer 150 and/or an associated component, such as a Bluetooth® beacon or radio frequency identification (RFID) component. In some implementations, the identifying characteristic may comprises an environmental characteristic (e.g., location of furniture, windows, and/or other visual cues) in proximity to the printer 150. Proximity to, the printer 150 may comprise such items and/or features within the field of view of the capturing device (e.g., within a picture captured by a camera associated with a mobile device). In some implementations, the identifying characteristic may comprise a code, digitally displayed on a control panel of the printer 150 and/or physically displayed on and/or near a surface of the printer 150. Such a code may comprise, for example an alphanumeric identifier/name, a bar code, and/or a matrix (e.g., QR®) code. In some implementations, the identifying characteristic may change on a periodic basis. For example, a digitally displayed matrix code may change every 24 hours.

In some implementations the capture identifying characteristic instructions 120 may comprise instructions to extract a network address for the printer according to the identifying characteristic. After capture identifying characteristic instructions 120 have captured the identifying characteristic, the specific printing device may be identified, such as by a unique device identifier and/or network address. The specific printing device features and capabilities may be made available for analysis to display document(s) instructions 125.

Display document(s) instructions 125 may display a plurality of documents suitable for printing on the printer 150. In some implementations, the plurality of documents suitable for printing on the printer 150 may comprise at least a subset of a second plurality of documents submitted as ready to print. Such a plurality of documents being suitable for printing on the printer 150 may comprise the printer 150 comprising at least one capability necessary for printing each of the plurality of documents. For example, a user may submit documents for printing from one and/or more devices, such as a mobile device, smartphone, laptop, desktop computer, voice assistant, etc. This may comprise the second plurality of documents submitted as ready to print.

The features and capabilities of the specific printing device identified by capture identifying characteristic instructions 120 may be compared to print requirements for each of the second plurality of documents in order to identify the plurality of documents suitable for printing on the printer 150. For example, some of the documents may require to be printed in color, duplexed, and/or with certain finishing features (e.g., stapling, collating, hole punch, etc.), If a required feature for a document is not available on printer 150, the document associated with the required feature may not be displayed in the plurality of documents suitable for printing on the printer 150.

Receive selection of document(s) instructions 130 may receive a selection of at least one document of the plurality of documents suitable for printing on the printer 150. For example, the plurality of documents suitable for printing on the printer may be displayed in a user interface on a mobile device after capturing the identifying characteristic of the printer 150. A user of the mobile device may select one and/or more of the plurality of documents suitable for printing on the printer 150 that the user desires to print on printer 150.

Cause document to be delivered instructions 135 may cause the selected at least one document to be delivered to the printer according to the identifying characteristic. For example, the second plurality of documents submitted as ready to print may be stored on a user's mobile device, at the printer 150, on a network storage location (e.g., cloud storage), on the user's desktop computer, and/or a combination of the preceding. Instructions 135 may cause the selected documents) to be transmitted from their storage location to printer 150 with a command to print the selected document(s). In some implementations, the instructions to cause the selected at least one document to be delivered to the printer according to the identifying characteristic may comprise instructions to authenticate a user associated with the plurality of documents. For example, a user may be required to provide a username and password and/or other identifying criteria (e.g., biometric characteristics, RFID cards). These criteria may be used by instructions 135 to validate, that a user associated with the plurality of documents, has permission to print to the printer 150.

Figure 2:
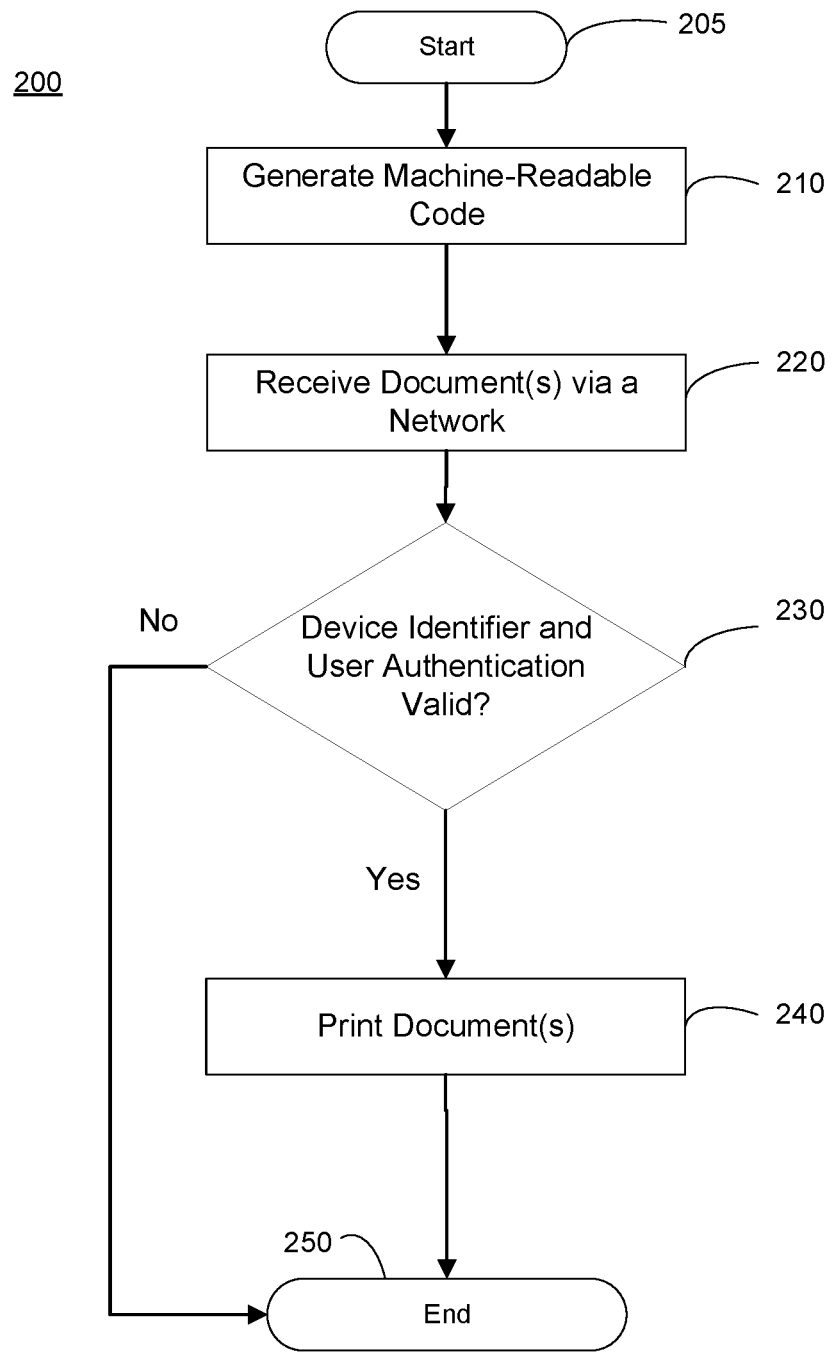
FIG. 2 is a block diagram of n example system for providing printer identifying characteristics.

FIG. 2 is a flowchart of an example method 200 for printer identifying characteristics. Although execution of method 200 is described below with reference to printer 150, other suitable components for execution of method 200 may be used.

Method 200 may begin at stage 205 and advance to stage 210 where printer 150 may generate a machine-readable code comprising a printer identifying characteristic. In some implementations, the printer identifying characteristic may comprise a one-time use identifier. For example, printer 150 may display a generated matrix code on a control panel display. A user may scan the matrix code to identify the printer (e.g., by receiving a device ID and/or network address via the matrix code). Once the matrix code has been scanned and used to identify the printer 150, the code may be changed for the next time it is scanned. This may prevent a user from taking a picture of the code and using it to print to printer 150 again at a later time, perhaps when the user is not near printer 150.

Method 200 may then advance to stage 220 where printer 150 may receive at least one document via a network, wherein the document comprises metadata comprising the printer identifying characteristic and a user authentication. For example, the user printer 150 may receive instructions to retrieve one and/or more documents associated with a user that are suitable for printing on printer 150. The user may select these documents from a list, which may be displayed, for example, on a control panel of printer 150. In some implementations, the displayed documents may comprise documents suitable for printing on printer 150; that is documents printer 150 has the necessary features and/or capabilities to print.

In some implementations, the user authentication may be prepared by a mobile device and/or cloud service associated with the user. For example, the user may capture the identifying characteristic of the printer 150 via the machine-readable code and select document(s) suitable for printing on the printer identified by the identifying characteristic. Those documents may then be sent to the printer from the mobile device and/or cloud service along with credentials associated with the user. The documents may also be sent with metadata comprising the identifying characteristic. In some implementations, the documents may be sent to multiple printers, but only the printer 150 that receives its own identifying characteristic may perform the print operation on the documents.

Method 200 may then advance to stage 230 where printer 150 may determine whether the printer identifying characteristic and the user authentication are valid. For example, printer 150 may verify the user credentials received with the documents are correct (e.g., a username and password are valid) and/or that the user identified by the credentials is authorized to print to printer 150. Printer 150 may, for example, comprise a list of authorized users and may determine whether the user credentials received with the document(s) are on that list.

In some implementations, the printer identifying characteristic comprises a one-time use identifier. Determining whether the printer identifying characteristic is valid comprises may, in some implementations, comprise determining whether the printer identifying characteristic has expired. For example, a printer may generate a matrix code that is valid for 48 hours and/or one use of the printer. If a print job is received with a matrix code that is outside the 48 hour validity window and/or which has already been used respectively, the printer identifying characteristic may be determined not to be valid.

In response to determining that the printer identifying characteristic and the user authentication are valid, method 200 may advance to stage 240 where printer 150 may print the document. Printer 150 may render, if necessary, the received document(s) and output them via the printer mechanism, such as a laser engine and/or ink printhead.

After printing the document at stage 240, or if the device identifier or user authentication is determined not to be valid at stage 230, method 200 may end at stage 250.

Figure 3:
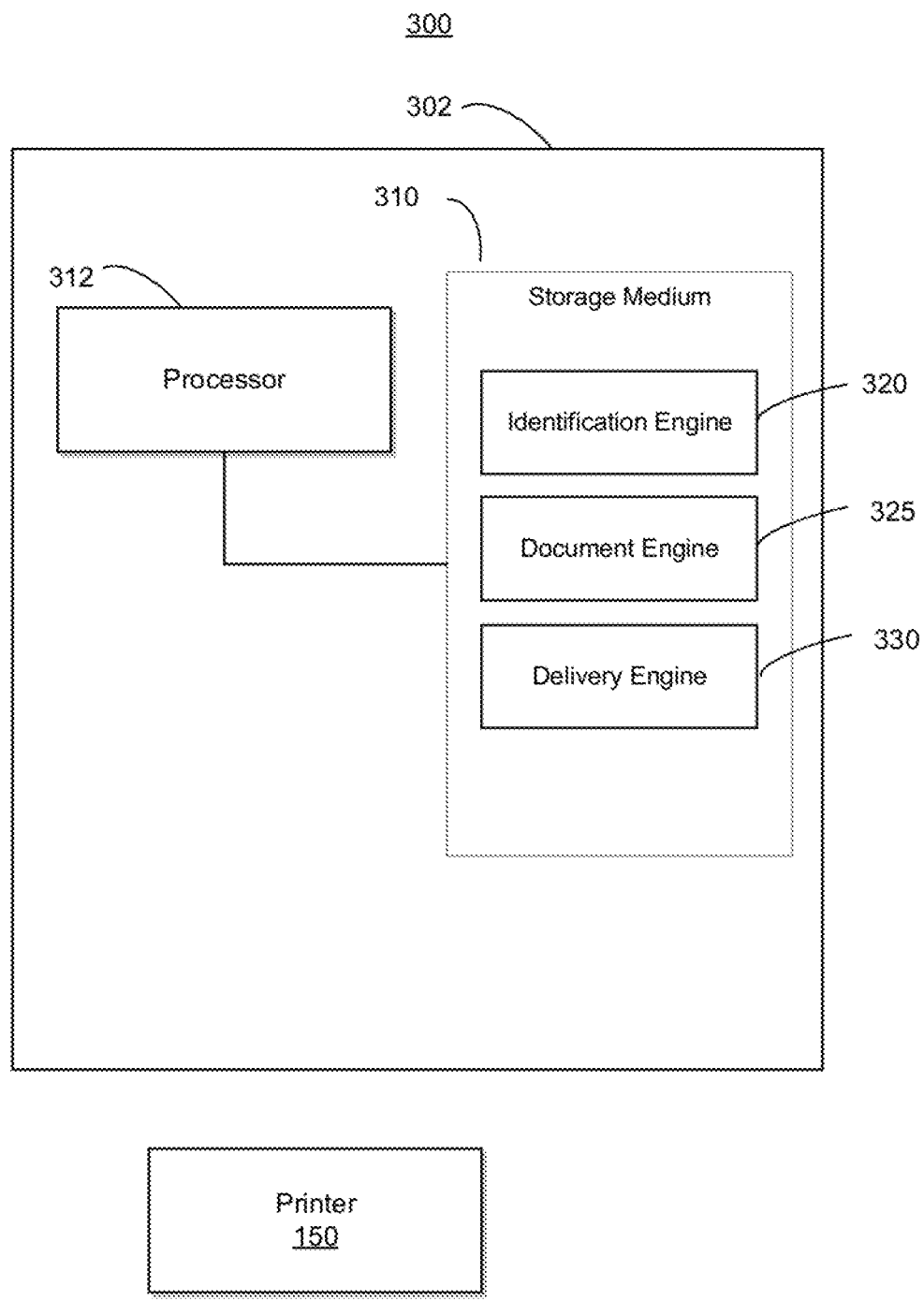
FIG. 3 is a flowchart of an example method for providing printer identifying characteristics.

FIG. 3 is a block diagram of an example apparatus 300 for providing printer identifying characteristics. Apparatus 300 may comprise a multi-function printer device 302 comprising a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, an identification engine 320, a document engine 325, and a delivery engine 330.

Each of engines 320, 325,330 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325, 330. In such examples, device 302 may comprise the machine-readable storage medium storing the instructions and the processing resource to execute the instructions, or the machine-readable storage medium may be separate but accessible to apparatus 300 and the processing resource.

Identification engine 320 may capture an identifying characteristic of a printer, wherein the identifying characteristic comprises a displayed machine-readable code, and identify a plurality of capabilities of the printer according to the identifying characteristic.

For example, identification engine 320 may execute capture identifying characteristic instructions 120 to capture an identifying characteristic of printer 150 in order to identify the specific printing device among a plurality of printing devices. For example, a user may utilize a camera-equipped mobile device to capture an image of some or all of the printer 150. For another example, an electronic device may capture a signal broadcast by the printer 150 and/or an associated component, such as a Bluetooth® beacon or radio frequency identification (RFID) component. In some implementations, the identifying characteristic may comprises an environmental characteristic (e.g., location of furniture, windows, and/or other visual cues) in proximity to the printer 150. Proximity to the printer 150 may comprise such items and/or features within the field of view of the capturing device (e.g., within a picture captured by a camera associated with a mobile device). In some implementations, the identifying characteristic may comprise a code digitally displayed on a control panel of the printer 150 and/or physically displayed on and/or near a surface of the printer 150. Such a code may comprise, for example an alphanumeric identifier/name, a bar code, and/or a matrix (e.g., QR®) code. In some implementations, the identifying characteristic may change on a periodic basis. For example, a digitally displayed matrix code may change every 24 hours.

In some implementations the capture identifying characteristic instructions 120 may comprise instructions to extract a network address for the printer according to the identifying characteristic. After capture identifying characteristic, instructions 120 have captured the identifying characteristic, the specific printing device may be identified, such as by a unique device identifier and/or network address. The specific printing device features and capabilities may be made available for analysis to display document(s) instructions 125.

Identification engine 320 may utilize the captured identifying characteristic to identify the specific printer and thereby determine features and functionalities available. Such feature lists may be provided in a database indexed by a unique identifier associated with the printer 150, for example, and/or may be extrapolated by general identification of the printer, such as by retrieving features available on all printers associated with a given model number.

Document engine 325 may display a plurality of documents suitable for printing on the printer according to the identified plurality of capabilities of the printer and receive a selection of at least one of the plurality of documents for printing on the printer. Document engine 325 may execute display document(s) instructions 125 to display a plurality of documents suitable for printing on the printer 150. In some implementations, the plurality of documents suitable for printing on the printer 150 may comprise at least a subset of a second plurality of documents submitted as ready to print. Such a plurality of documents being suitable for printing on the printer 150 may comprise the printer 150 comprising at least one capability necessary for printing each of the plurality of documents. For example, a user may submit documents for printing from one and/or more devices, such as a mobile device, smartphone, laptop, desktop computer, voice assistant, etc. This may comprise the second plurality of documents submitted as ready to print.

The features and capabilities of the specific printing device identified by capture identifying characteristic instructions 120 may be compared to print requirements for each of the second plurality of documents in order to identify the plurality of documents suitable for printing on the printer 150. For example, some of the documents may require to be printed in color, duplexed, and/or with certain finishing features (e.g., stapling, collating, hole punch, etc.). If a required feature for a document s not available on printer 150, the document associated with the required feature may not be displayed in the plurality of documents suitable for printing on the printer 150.

Receive selection of document(s) instructions 130 may receive a selection of at least one document of the plurality of documents suitable for printing on the printer 150. For example, the plurality of documents suitable for printing on the printer may be displayed in a user interface on a mobile device after capturing the identifying characteristic of the printer 150. A user of the mobile device may select one and/or more of the plurality of documents suitable for printing on the printer 150 that the user desires to print on printer 150.

Delivery engine 330 may determine whether the user is authorized to print to the printer, and in response to determining that the user is authorized to print to the printer, cause the selected at least one document to be delivered to the printer according to the identifying characteristic. In some implementations, delivery engine 330 may execute cause document to be delivered instructions 135 to cause the selected at least one document to be delivered to the printer according to the identifying characteristic. For example, the second plurality of documents submitted as ready to print may be stored on a user's mobile device, at the printer 150, on a network storage location (e.g., cloud storage), on the user's desktop computer, and/or a combination of the preceding. Instructions 135 may cause the selected document(s) to be transmitted from their storage location to printer 150 with a command to print the selected document(s). In some implementations, the instructions to cause the selected at least one document to be delivered to the printer according to the identifying characteristic may comprise instructions to authenticate a user associated with the plurality of documents. For example, a user may be required to provide a username and password and/or other identifying criteria (e.g., biometric characteristics, RFID cards). These criteria may be used by instructions 135 to validate that a user associated with the plurality of documents has permission to print to the printer 150.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine readable medium storing instructions executable by a printer to:
   generate and provide a machine-readable code comprising an identifying characteristic of the printer;
   retrieve and display on a control panel of the printer a plurality of documents suitable for printing on the printer, each document comprising the identifying characteristic of the printer and a user authentication of the user;
   receive via the control panel user selection of at least one document of the plurality of documents suitable for printing on the printer;
   determine whether the user of each of the at least one document that has been selected is authorized to print to the printer, based on the user authentication; and
   in response to determining that the user of each of the at least one document that has been selected is authorized to print to the printer, print the at least one document that has been selected.

2. The non-transitory machine readable medium of claim 1, wherein the identifying characteristic comprises a code digitally displayed on the control panel of the first printer.

3. The non-transitory machine readable medium of claim 1, wherein the identifying characteristic comprises a code physically displayed on a surface of the first printer.

4. The non-transitory machine readable medium of claim 1, wherein the identifying characteristic comprises an environmental characteristic in proximity to the printer.

5. The non-transitory machine readable medium of claim 1, wherein the plurality of documents suitable for printing on the printer comprise at least a subset of a second plurality of documents submitted as ready to print.

6. The non-transitory machine readable medium of claim 5, wherein the plurality of documents are suitable for printing on the printer in that the printer comprises at least one capability necessary for printing each of the plurality of documents.

7. The non-transitory machine readable medium of claim 1, wherein the instructions to generate and provide the machine-readable code comprising the identifying characteristic of the printer comprise instructions to extract a network address for the printer according to the identifying characteristic.

8. The non-transitory machine readable medium of claim 1, wherein the identifying characteristic changes on a periodic basis.

9. A method comprising:
   generating, by a printer, a machine-readable code comprising a printer identifying characteristic;
   receiving, by the printer, at least one document via a network, wherein the document comprises metadata comprising the printer identifying characteristic and a user authentication;
   determining, by the printer, whether the printer identifying characteristic and the user authentication are valid; and
   in response to determining that the printer identifying characteristic and the user authentication are valid, printing the document by the printer that received the document comprising the metadata comprising the printer identifying characteristic and the user authentication.

10. The method of claim 9, wherein the printer identifying characteristic comprises a one-time use identifier.

11. The method of claim 9, wherein determining whether the printer identifying characteristic is valid comprises determining whether the printer identifying characteristic has expired.

12. The method of claim 9, wherein determining whether the user authentication is valid comprises determining whether a user associated with the document has permission to print to the printer.

13. A printer comprising:
   a control panel;
   a processor; and
   a memory storing instructions executable by the processor to:
      provide an identifying characteristic of the printer, wherein the identifying characteristic comprises a displayed machine-readable code according to which a plurality of capabilities of the printer are identifiable;
      retrieve and display on the control panel a plurality of documents suitable for printing on the printer according to the plurality of capabilities of the printer, each document comprising the identifying characteristic of the printer and a user authentication of a user;
      receive, via the control panel, user selection of at least one of the plurality of documents for printing on the printer;
      determine whether the user of each of the at least one of the plurality of documents that has been selected is authorized to print to the printer, based on the user authorization; and
      in response to determining that the user of each of the at least one of the plurality of documents that has been selected is authorized to print to the printer, print the at least one of the plurality of documents that has been selected.

* * * * *